Oct. 20, 1964  H. D. WANDSCHEER  3,153,409
FURNACE
Filed Jan. 12, 1962  3 Sheets-Sheet 1

INVENTOR.
Harold D. Wandscheer
BY
Sam J. Slotsky
ATTORNEY

INVENTOR.
Harold D. Wandscheer
BY
ATTORNEY

3,153,409
FURNACE
Harold D. Wandscheer, Sioux Center, Iowa
Filed Jan. 12, 1962, Ser. No. 165,898
1 Claim. (Cl. 126—110)

My invention relates to a furnace.

An object of my invention is to provide a furnace especially usable for poultry houses and the like, and which furnace includes certain features wherein the furnace fan and air passages around and about the heat exchanger are not affected by animal feed dust.

A further object of my invention is to provide a furnace having certain features wherein a fresh air supply can be furnished to the burner itself, which generates heat for the furnace.

A further object of my invention is to provide a furnace which includes certain features wherein the circulation of the gases and the fresh air and the like can be controlled at will.

A further object of my invention is to provide certain baffle members which will re-direct the heat in an efficient manner.

A further object of my invention is to provide a furnace having a variety of control features to control the cold and heated air supply.

A further object of my invention is to provide a furnace that may be used in conjunction with that type of apparatus described in my co-pending application, Serial No. 61,615, filed October 10, 1960, on a Heat Reclaiming Ventilator, wherein the heat generated from the products of combustion by the furnace is reclaimed and recirculated in such a manner so that a maximum amount of heat is reclaimed.

Figure 1:
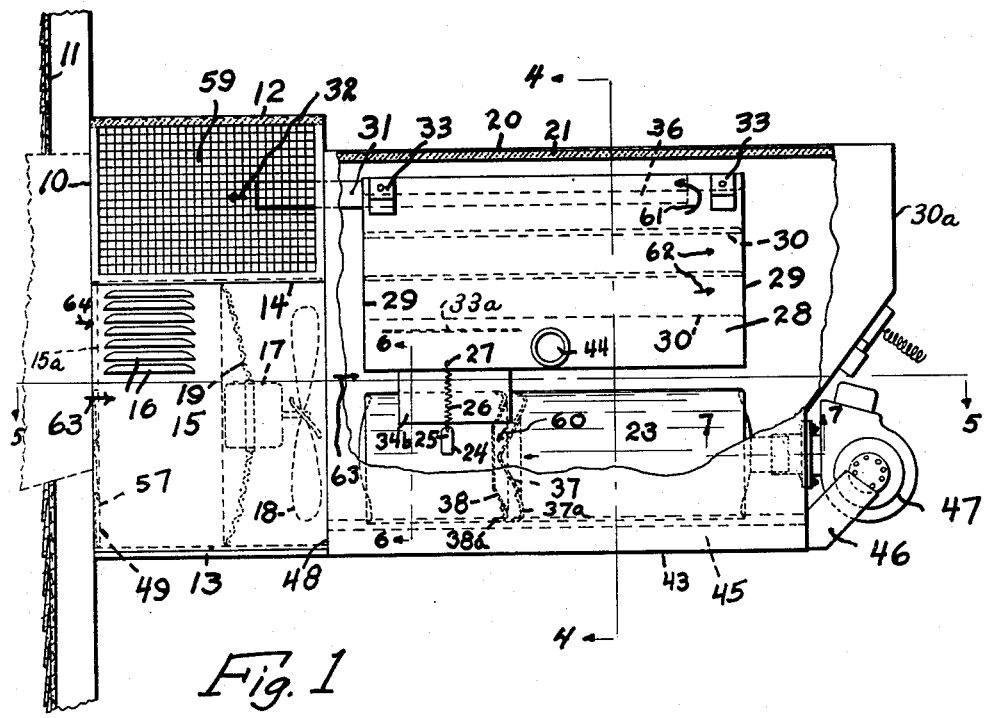
Figure 2:
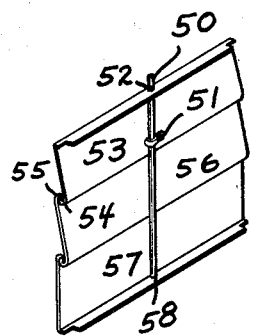
Figure 3:
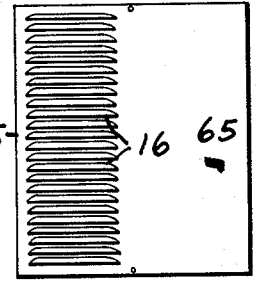
Figure 4:
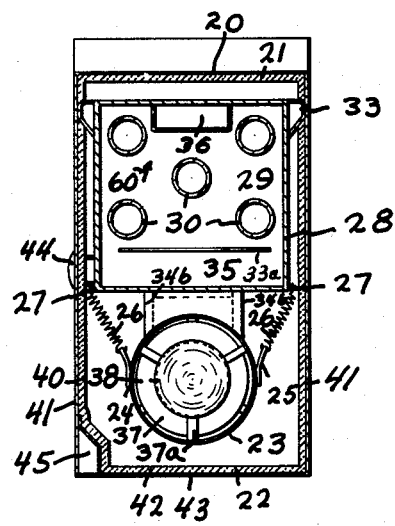
Figure 5:
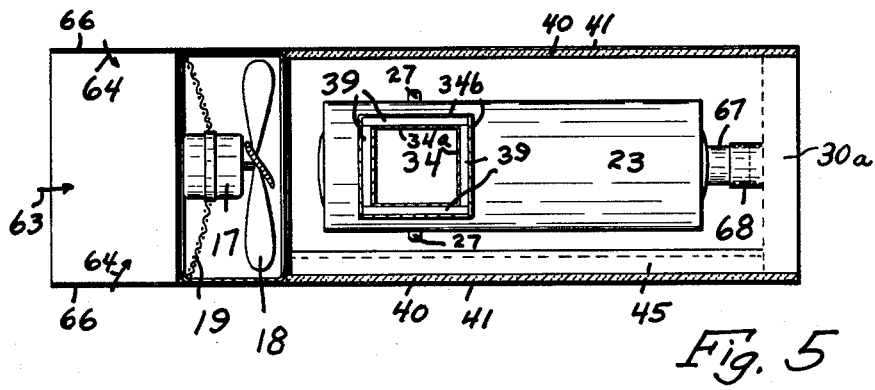
Figure 6:
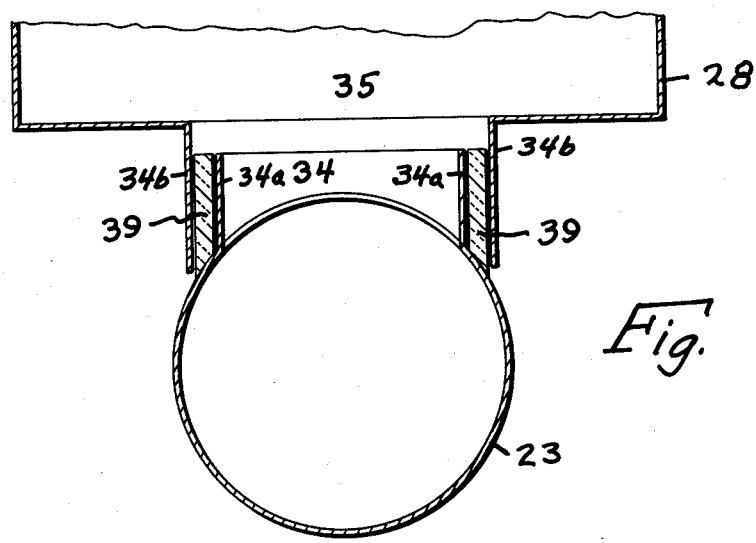
Figure 7:
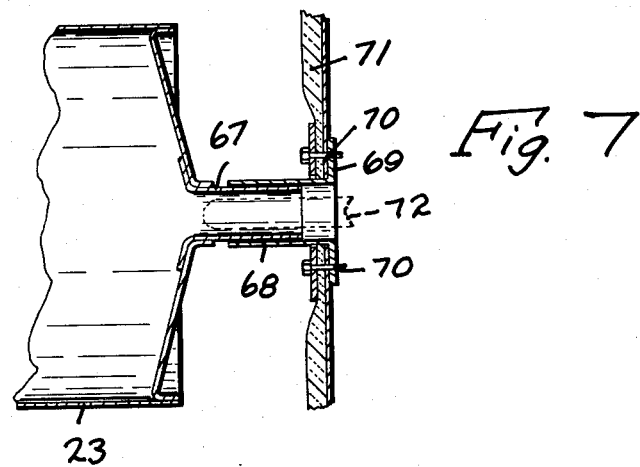

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

FIGURE 1 is a side elevation with fragmentary sections of my furnace,

FIGURE 2 is a detail of FIG. 1 of an air shutter of the draft regulating arrangement, FIGURE 3 is a further detail of FIG. 1 of a removable partition of the arrangement for changing the air source supply, FIGURE 4 is a sectional view taken along the lines 4—4 of FIGURE 1, FIGURE 5 is a sectional view taken along the lines 5—5 of FIGURE 1, FIGURE 6 is a sectional view taken along the lines 6—6 of FIGURE 1, and FIGURE 7 is a sectional view taken along the lines 7—7 of FIGURE 1.

My invention relates to a furnace having certain unique characteristics, my furnace being adapted to be used generally in combination with that type of apparatus described in my co-pending application, Serial No. 61,615, filed October 10, 1960, on a Heat Reclaiming Ventilator.

In the aforesaid application, I have described a certain heat reclaiming ventilator which includes an opening 10 which will communicate with the present furnace of my invention, and I have used the character 11 to indicate the wall of the poultry house or the like. The character 12 indicates an insulated fire wall, the character 13 a bottom wall, and the character 14 a center dividing wall, with the character 15 indicating a replaceable door or wall having the louvers 16 therein, whereby characters 13, 14, and 49 and 15 comprise the fan compartment.

The character 17 indicates an electric motor which drives the fan blades 18, the character 19 indicating framework portions of the fan. The character 20 indicates a further top wall having the insulating lining 21, the character 43 indicating a bottom wall. The character 23 indicates a cylindrical burner chamber to which are attached at 24 the straps 25, which straps are attached to the coiled springs 26 which are attached as at 27 to the substantially rectangular further chamber 28, the chamber 28 including the end walls 29, and communicating through these end walls are the various tubes 30. Communicating through one of the end walls is a further tube 31 which is adapted to carry the exhaust gases in the direction of the arrow 32 (see FIGURE 1). The character 33 indicates suitable brackets to suspend the furnace for installation purposes. The character 33a designates a horizontally positioned baffle attached in any desired manner.

Communicating with the chamber 23 is a vertical opening 34 which communicates with the space 35 beneath the chamber 28. The side walls 34a are attached to the chamber 23, whereas the side walls 34b are attached to the chamber 28. The space 36 communicates with the tube 31.

The character 37 indicates a baffle plate which is substantially conical in shape as shown in FIGURE 1, and which is suitably supported by means of the brackets 37a.

The character 38 indicates a further baffle plate somewhat smaller in diameter than the chamber 23, and is suitably supported by means of the brackets 38a. The said baffle plate contains an opening substantially concentric to its center, and the said opening is somewhat smaller than the outside diameter of the baffle 37 (see FIGURE 4).

The character 39 indicates further refractory insulating members between the walls 34a and 34b to provide telescopic union of the chamber 23 (see FIGURE 7) and the chamber 28, held in position by the spring 26, and the character 40 indicates still further insulating members attached along the side walls 41. The character 42 indicates an insulating member attached along the bottom wall 43, and the character 44 indicates a suitable cleanout opening.

Extending along a lower corner of the chamber comprising the walls 41 and 42 is a passageway 45 which extends into the portion 46, which portion 46 communicates with the burner blower unit 47, the passageway 45 being open as at 48, this passageway thereby providing means for obtaining fresh air for the burner as will be obvious from the description.

Positioned along the end wall 49 is a vertically positioned rod 50, suitably attached to the center dividing wall 14. The character 51 indicates a clamp which frictionally engages the rod 50, with the rod 50 passing through the opening 52, and the rod 50 being received in an upper closure flap 53 having the lower curled portions at 54 adapted to receive the upper curled portions 55 of the further flap 56, the flap 57 being of similar construction and engaging the rod at 58. The character 59 indicates a pair of screen members to more or less protect the entrance of fowl, etc. into this space.

The furnace operates in the following manner. The furnace is primarily intended to operate with the device disclosed in my aforesaid co-pending application, which discloses an arrangement for utilizing the exhaust hot air passing outwardly from the building.

It will be noted that the exhaust air passing from the present unit through the tube 31, etc. will pass into this structure disclosed in my co-pending application, and will perform the necessary functions therewith. It will also be noted that the flame generated in the chamber 23 will pass about the baffle members 37 and 38 in the direction of the arrows 60 and upwardly through the space 34, and this flame and heat will pass in the direction of the arrows 61 (see FIGURE 1), with the hot exhaust gases passing through the tube 31 discharging at the arrow 32 and further passing into my heat reclaiming ventilator structure as disclosed in my aforesaid co-pending application. Meanwhile, the hot air which is to pass within the building will pass in the direction of the arrow 62 through the various tubes 30, through the opening 30a and thence directly into the brooder house or other structure.

As a result of this construction, coordinating with the aforesaid heat reclaiming ventilator, the maximum amount of heat is reclaimed from the products of combustion, providing means for obtaining fresh air passing in the direction of the arrow 63, which air is blown by means of the fan blades 18 into the furnace, and further, a portion of the fresh air thereof is blown into the passageway 45, providing fresh air for combustion. The supporting means at 26 etc. provides means for replacing the chamber 23 etc. when necessary, and also provides means for absorbing the expansion effects.

The construction shown in FIGURE 2 can be used for regulating the amount of fresh air passing in the direction of the arrows 63, wherein the flaps 53, 56 and 57 can be raised or lowered to thereby regulate this draft as shown by the arrow 63.

The partition 15 which is shown more specifically in FIGURE 3 and which includes the openings at 16 and the solid portion at 65 is used in the following manner. As shown in FIGURE 1, the air within the building can be re-circulated through the furnace as shown by the arrows 64. However, by removing the said partitions 15 from the opening 15a and swinging them either from the position shown in FIGURE 1 or 3, and wherein the portions 65 form side walls, whereby the space formerly occupied by the louvers 16 will be closed, the fan 18 will then force fresh air only in the direction shown by the arrow 63. If desired, a single partition 15 can be used at one side, or these partitions could be used at either side.

FIGURE 5 discloses the burner entrance into the cylindrical burner chamber 23, the character 67 indicating an inner hollow tube which is slidably engaged within an outer hollow tube 68, this feature thereby allowing expansion and contraction, FIGURE 7 showing further details wherein the outer tube 68 can be attached by means of the flange 69, bolts or pins 70 etc., the character 71 indicating the end wall insulation and the character 72 indicating the burner draft tube.

It will now be seen that I have provided the advantages mentioned in the objects of my invention with further advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A furnace comprising an outer casing unit, a burner, an inner chamber spaced from said outer casing and including a plurality of longitudinally positioned hollow tubes, a lower heat generating chamber, said heat generating chamber including baffle members therein, said baffle members being substantially conical, a telescoping passageway between said inner chamber and said heat generating chamber, and being positioned adjacent the end wall of said heat generating chamber opposite said burner, said baffle members being positioned substantially adjacently to said passageway to provide means whereby flame generated in said heat generating chamber will pass about said baffles and upwardly to said inner chamber, said baffle members being normal to the walls of said heat generating chamber and being positioned intermediate said burner and said passageway, said outer casing including a further passageway at a lower corner thereof for communicating to said burner to provide an air supply for said burner, means for suspending said heat generating chamber including a pair of springs attached thereto and to said inner chamber, said outer casing including a further chamber portion extending therefrom, a fan in said further chamber portion, said fan being adapted to force fresh air through said longitudinally positioned tubes, said further chamber portion including open side portions, partitions normally closing said open side portions, said partitions including one having a plurality of openings at one side of the chamber and the other having solid portions at the other side of the chamber whereby reversal of said partitions will change the source of air into said fan by either closing said open spaces or providing openings to the same, said further chamber portion including a further opening adapted to communicate through a building wall, means for controlling the size of said further opening, said unit having a fresh air inlet for supplying into said fan, and a heated air outlet for connecting said longitudinally, positioned tubes and the space to be heated.

References Cited in the file of this patent

UNITED STATES PATENTS

| 2,299,901 | Johnston | Oct. 27, 1942 |
| 2,484,161 | Fulton | Oct. 11, 1949 |
| 2,893,374 | Wilson | July 7, 1959 |

FOREIGN PATENTS

| 503,805 | Belgium | June 30, 1951 |
| 825,001 | Germany | Dec. 17, 1951 |